(12) United States Patent
Yoshikoshi et al.

(10) Patent No.: US 10,476,265 B2
(45) Date of Patent: Nov. 12, 2019

(54) ELECTRIC APPARATUS AND POWER CONTROL METHOD

(71) Applicant: TOSHIBA TEC KABUSHIKI KAISHA, Shinagawa-ku, Tokyo (JP)

(72) Inventors: Kazuyuki Yoshikoshi, Singapore (SG); Hiroshi Tsuchimoto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/037,005

(22) Filed: Jul. 17, 2018

(65) Prior Publication Data

US 2018/0323610 A1 Nov. 8, 2018

Related U.S. Application Data

(63) Continuation of application No. 15/844,796, filed on Dec. 18, 2017, now Pat. No. 10,050,440, which is a (Continued)

(51) Int. Cl.
*H02J 1/00* (2006.01)
*H02J 7/00* (2006.01)
(Continued)

(52) U.S. Cl.
CPC ............... *H02J 1/00* (2013.01); *G03G 15/00* (2013.01); *G03G 15/5004* (2013.01); *H02J 1/10* (2013.01);
(Continued)

(58) Field of Classification Search
CPC ............. H02J 7/007; H02J 1/00; H02J 7/0068
See application file for complete search history.

(56) References Cited

U.S. PATENT DOCUMENTS 7,339,353 B1 3/2008 Masias et al.
7,615,965 B2 * 11/2009 Popescu-Stanesti ...... H02J 1/08
307/46
(Continued)

FOREIGN PATENT DOCUMENTS

JP 2006-296126 10/2006

OTHER PUBLICATIONS

Non-Final Office Action for U.S. Appl. No. 15/008,696 dated Mar. 7, 2017, 22 Pages.

*Primary Examiner* — Alfonso Perez Borroto
(74) *Attorney, Agent, or Firm* — Amin, Turocy & Watson LLP

(57) ABSTRACT

An electric apparatus according to an embodiment includes a plurality of connection devices connectable to a plurality of external power supplies; a battery; a charge circuit to charge the battery using electric power supplied from the external power supplies; a plurality of switch sections each connected between the connection devices and the charge circuit; a storage section to store therein a priority degree for supplying power to the battery for each power supply type of the external power supplies; and a controller to control power supply from the external power supplies to the charge circuit. The controller detects power supply types of the external power supplies connected to the connection devices, and compares priority degrees corresponding to the power supply types detected and switches off the switch sections of the connection devices that are connected to the external power supplies except an external power supply having a highest priority degree.

5 Claims, 9 Drawing Sheets

Related U.S. Application Data continuation of application No. 15/008,696, filed on Jan. 28, 2016, now Pat. No. 9,876,351.

(51) Int. Cl.
*H02J 1/10* (2006.01)
*G03G 15/00* (2006.01)

(52) U.S. Cl.
CPC ............ *H02J 7/007* (2013.01); *H02J 7/0055* (2013.01); *H02J 7/0068* (2013.01)

(56) References Cited

U.S. PATENT DOCUMENTS

| | | |
|---|---|---|
| 7,701,083 B2 | 4/2010 | Savage |
| 8,791,814 B2 | 7/2014 | Albsmeier et al. |
| 9,166,434 B2 | 10/2015 | Huang et al. |
| 9,252,631 B2 | 2/2016 | Latham |
| 2005/0141154 A1* | 6/2005 | Consadori ............ B60R 16/023 361/62 |
| 2009/0100275 A1* | 4/2009 | Chang .................... G06F 1/266 713/300 |
| 2010/0218530 A1* | 9/2010 | Melbostad ......... B60H 1/00371 62/244 |

* cited by examiner

| POWER SUPPLY TYPE | SUPPLY CAPACITY | PRIORITY DEGREE |
|---|---|---|
| AC ADAPTER | 19.5V/2.63A | 1 |
| NON-CONTACT POWER SUPPLY | 5V/1A | 2 |
| USB 3.0 | 5V/900mA | 3 |
| USB 2.0 | 5V/500mA | 4 |

FIG.6

| POWER SUPPLY TYPE | SUPPLY CAPACITY | SUPPLY DESTINATION INFORMATION | | |
|---|---|---|---|---|
| | | COMMUNICATION | PRINTING | WAITING |
| AC ADAPTER | 19.5V/2.63A | O | O | O |
| NON-CONTACT POWER SUPPLY | 5V/1A | O | X | O |
| USB 3.0 | 5V/900mA | O | X | O |
| USB 2.0 | 5V/500mA | O | X | X |

# ELECTRIC APPARATUS AND POWER CONTROL METHOD

CROSS-REFERENCE TO RELATED APPLICATIONS

This application is a Continuation of application Ser. No. 15/844,796 filed on Dec. 18, 2017, which is a Continuation of application Ser. No. 15/008,696 filed on Jan. 28, 2016, now U.S. Pat. No. 9,876,351, the entire contents of both of which are incorporated herein by reference.

FIELD

Embodiments described herein relate generally to an electric apparatus and a power control method.

BACKGROUND

Conventionally, there exists an electric apparatus capable of connecting a plurality of external power supplies, for example, an AC adapter, a non-contact power supply apparatus and the like. If connected with an external power supply, the electric apparatus operates through power supplied from this external power supply.

Incidentally, in a case in which the above-mentioned electric apparatus is connected with a plurality of external power supplies, it is general that an external power supply connected therewith firstly is used preferentially. Thus, for example, even if supply capacity of an external power supply connected therewith later is higher than that of the external power supply connected therewith firstly, the latter external power supply cannot be used, which leads to inefficiency.

DESCRIPTION OF THE DRAWINGS

FIG. 6 is a diagram exemplifying the data structure of a supply destination table shown in FIG. 5;

DETAILED DESCRIPTION

In accordance with an embodiment, an electric apparatus, contains a plurality of connection devices to be connectable to a plurality of external power supplies; a battery; a charge circuit to charge the battery using electric power supplied from the external power supplies; a plurality of switch sections each connected between the connection devices and the charge circuit; a storage section to store therein a priority degree for supplying power to the battery for each power supply type of the external power supplies; and a controller to control power supply from the external power supplies to the charge circuit. The controller is programmed to detect power supply types of the external power supplies that are connected to the connection devices, and compare priority degrees corresponding to the power supply types detected and switch off the switch sections of the connection devices that are connected to the external power supplies except an external power supply having a highest priority degree.

Hereinafter, the embodiments of the electric apparatus and a power control method are described in detail with reference to the accompanying drawings. In the embodiment described hereinafter, it is exemplified that the electric apparatus is applicable to a portable printer apparatus (hereinafter, referred to as a "portable printer"). The embodiment described hereinafter is one embodiment of the electric apparatus and the power control method, and structure and specification thereof are not limited.

Figure 1:
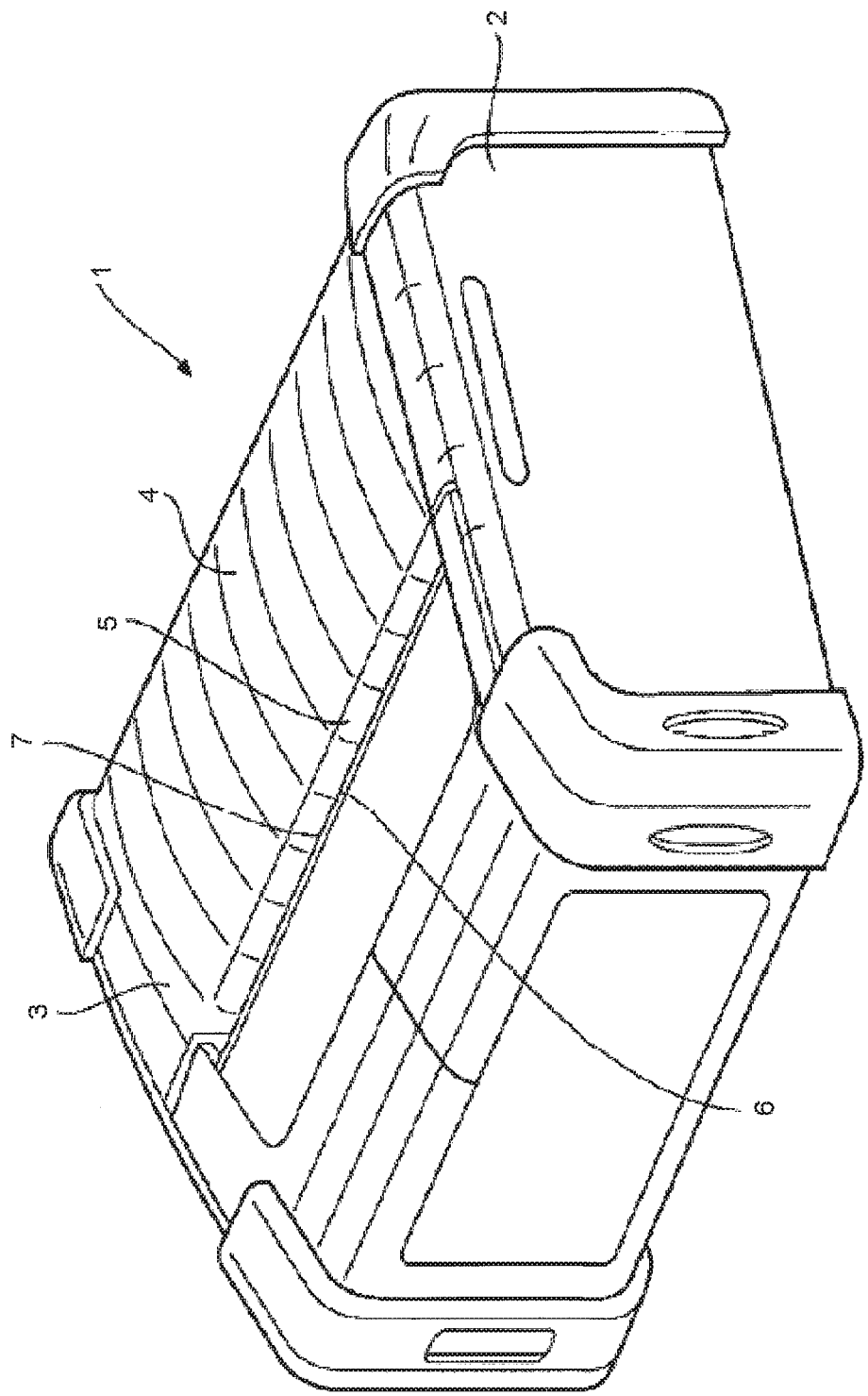
FIG. 1 is a perspective view exemplifying the external structure of a portable printer according to an embodiment.

FIG. 1 is a perspective view exemplifying the external structure of a portable printer 1 according to the embodiment. As shown in FIG. 1, the portable printer 1 is provided with a rectangular parallelepiped-shaped housing 2. The housing 2 has an internal structure capable of storing a paper roll formed by winding printing papers consisting of heat-sensitive papers. A rechargeable battery 14, various control systems and a printer engine (refer to FIG. 2 and FIG. 5) described later are stored inside the housing 2.

An opening 3 is formed on the upper surface of the housing 2 to enable the paper roll to be introduced into the inside of the housing 2. A cover 4 is rotatably arranged on the opening 3. The opening 3 is turned into an open state or a closed state with the cover 4 open and closed.

The cover 4 is mounted on the rear side of the housing 2 that forms a side of the opening 3. A paper discharging port 7 is formed at a gap portion between an outer side 5 serving as the front end side of the cover 4 and a front side 6 serving as aside of the opening 3 in a state where the cover 4 is closed. The printed printing paper is discharged from the paper discharging port 7. An under-mentioned power source connection section 12 (refer to FIG. 2) is arranged at the side surface or the bottom of the housing 2.

Figure 2:
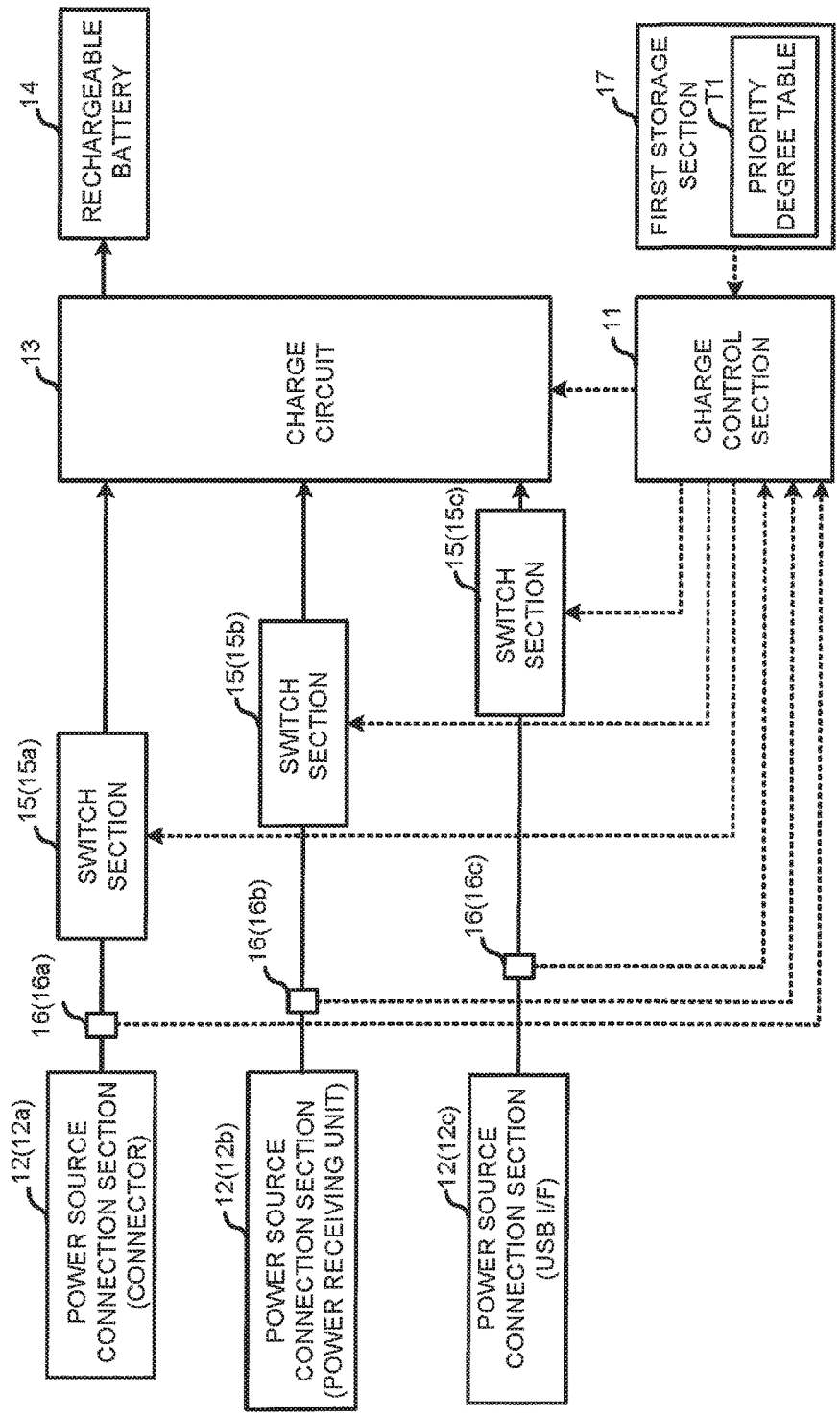
FIG. 2 is a block diagram exemplifying a charge control system according to the embodiment.

Next, the internal structure of the portable printer 1 is described. A charge control system relating to a charge control of the portable printer 1 is first described. FIG. 2 is a block diagram exemplifying the charge control system of the portable printer 1.

As shown in FIG. 2, the charge control system of the portable printer 1 is provided with a charge control section 11, the power source connection sections 12, a charge circuit 13, the rechargeable battery 14, switch sections 15, detecting points 16 and a first storage section 17. In FIG. 2, solid lines indicate power supply lines and dotted lines indicate signal lines.

The charge control section 11 is equipped with a computer structure such as a processor such as a CPU (Central Processing Unit) and control circuits (modules, circuits, or components), a ROM (Read Only Memory) and a RAM (Random Access Memory). The charge control section 11 functions as a detection section, a selection section and a power supply control section.

Part or all of the functions of the charge control section 11 may be a software structure realized through the cooperation of the processor and programs. Furthermore, part or all of the functions of the charge control section 11 may be a hardware structure realized by a dedicated processor.

The power source connection section 12 is a connection device such as a connector, an I/F (interface) and a power receiving apparatus that is connectable with various external power supplies. The portable printer 1 of the present embodiment includes a plurality of power source connection sections 12.

In FIG. 2, three power source connection sections 12a~12c are exemplified as the power source connection section 12. The power source connection section 12a is a connector that is connectable with an AC adapter designed for the portable printer 1. The power source connection section 12b is a power receiving unit that can receive power supplied from a power supply apparatus in a non-contact power supply manner. The power source connection section 12c is a USB I/F that can receive USB power supplied as bus power. Further, it is assumed that the power source connection section 12c can transmit and receive a signal conforming to a USB standard. Hereinafter, if not specified, the power source connection sections 12a~12c are uniformly depicted as the power source connection section 12 simply.

The charge circuit 13 charges the rechargeable battery 14 with the use of power supplied from power source under the control of the charge control section 11. The rechargeable battery 14 is a battery capable of charging and discharging such as a lithium-ion battery.

The switch sections 15 each that are arranged in association with each of the power source connection sections 12 enable or disable the power supply function (power receiving function) of the power source connection section 12. The switch section 15 is constituted by, for example, a switch element.

In FIG. 2, it is exemplified that switch sections 15a~15c each are arranged on power supply lines that connect the power source connection sections 12a~12c with the charge circuit 13 as the switch section 15. The switch sections 15a~15c, under the control of the charge control section 11 and an under-mentioned power supply control section, switch on (power on) and off (power off) to enable or disable the power source connection sections 12 respectively corresponding to the switch sections. The default state (initial state) of the switch sections 15a~15c is assumed as on state. Hereinafter, if not specified, the switch sections 15a~15c are uniformly depicted as the switch section 15 simply.

The detecting points 16 each that are arranged in association with each of the power source connection sections 12 are used to detect attachment/detachment of the external power supply to/from the power source connection section 12. In FIG. 2, it is exemplified that the detecting points 16a~16c each are arranged on the power supply lines between the power source connection sections 12a~12c and the switch sections 15. Hereinafter, if not specified, the detecting points 16a~16c are uniformly depicted as the detecting point 16 simply.

The charge control section 11 detects the attachment/detachment of the external power supply to/from the power source connection section 12 via the detecting point 16. Regardless of the detection method, for example, it is applicable to detect the attachment/detachment of the external power supply by detecting power (voltage or electric current) supplied from the external power supply via the detecting point 16. Further, the charge control section 11 detects the power supply type and the number of connected external power supplies according to the relationship between the setting position of the detecting point 16 that detects the connection of the external power supply and the power source connection section 12.

The first storage section 17, which is a non-volatile recording medium, stores setting information relating to a charge control. For example, the first storage section 17 stores a priority degree table T1 in which a priority degree is determined by each power supply type.

Figure 3:
FIG. 3 is a diagram exemplifying the data structure of a priority degree table shown in FIG. 2.

FIG. 3 is a diagram exemplifying the data structure of the priority degree table T1. As shown in FIG. 3, the priority degree table T1 contains data items "power supply type", "supply capacity" and "priority degree".

The data item "power supply type" corresponds to a power supply type of an external power supply connectable with a power source connection section 12. In FIG. 3, it is exemplified that "AC adapter", "non-contact power supply" and "USB power" that are respectively connectable with each of power source connection sections 12a~12c are set as the power supply types. The supply capacities of the USB power differ from each other due to the difference in versions of USB standard, and thus the power supply type is set for each version.

The data item "supply capacity" indicates specification (ampere, volt) of power supplied from the external power supply of each power supply type. The data item "priority degree" determines priority of the external power supplies used for charging. In FIG. 3, an external power supply whose numerical number of priority degree is smaller is used preferentially.

Herein, it is preferred that the priority degree to each external power supply is set according to supply capacity of the external power supply. More specifically, it is preferred to set priority degree to preferentially use an external power supply of which supply capacity is higher than that of the rest. The priority degree may be set manually by the user or automatically by the portable printer 1 (charge control section 11).

For example, in a case of the external power supply shown in FIG. 3, the charge control section 11 sets that the priority degree of the AC adapter whose supply capacity is maximum is highest. Further, the charge control section 11 sets that priority degrees of the non-contact power supply, USB 3.0 and USB 2.0 are sequentially lowered. Through the setting in this way, in a case in which a plurality of external power supplies is connected, the rechargeable battery 14 is charged by the external power supply whose supply capacity is higher, thereby being charged efficiently.

In the foregoing structure, the charge control section 11 executes the charge control described below in a case of carrying out the charging of the rechargeable battery 14.

First, the charge control section 11 detects the number and power supply type of external power supplies connected with the power source connection section 12. The charge control section 11, on the condition that one external power supply is detected, selects the external power supply to charge the rechargeable battery 14 through the charge circuit 13 with the use of power supplied from the external power supply. More specifically, the charge control section 11 sets charge current and charge voltage corresponding to the supply capacity of the external power supply in the charge circuit 13 to charge the rechargeable battery 14 through the charge circuit 13 according to the set value.

Further, the charge control section 11, on the condition that a plurality of external power supplies is detected, selects one of these external power supplies that is used to charge the rechargeable battery 14. The charge control section 11, for power supply types of detected external power supplies, reads out priority degrees set according to the power supply types from the priority degree table T1. Next, the charge control section 11 compares the read priority degrees to select the external power supply corresponding to the power supply type of which the priority degree is set to be higher than that of the rest.

As another example of the selection method, the charge control section 11 may select an external power supply according to the supply capacity set in the priority degree table T1. In this case, the charge control section 11, for power supply types of detected external power supplies, reads out supply capacities set according to the power supply types from the priority degree table T1. Next, the charge control section 11 compares the read supply capacities to select the external power supply corresponding to the power supply type of which the supply capacity is set to be higher than that of the rest.

In a case in which it is detected that the external power is connected with the power source connection section 12c, the supply charge control section 11 detects the version of connection standard of USB power through the power source connection section 12c. Then, the charge control section 11 selects an external power supply used to charge the rechargeable battery 14 according to the priority degree of the detected version.

Next, the charge control section 11 sets the switch sections 15 of the power source connection sections 12 relating to other external power supplies except the selected external power supply among a plurality of external power supplies connected with the power source connection section 12 to be switched off. In this way, the power receiving (power supply) function of the power source connection section 12 is disabled. Then, the charge control section 11 charges the rechargeable battery 14 through the charge circuit 13 with the use of the power supplied from the selected external power supply.

For example, in a case in which the USB power of the USB 3.0 is connected with the power source connection section 12c, the charge control section 11 detects the USB power of the USB 3.0. In this case, the charge control section 11 charges the rechargeable battery 14 through the charge circuit 13 with the use of the power supplied from the USB power (power source connection section 12c). Further, during the period of the charging, if AC adapter is connected with the power source connection section 12a, the charge control section 11 detects the connection of the USB power of the USB 3.0 and the AC adapter with the power source connection sections 12. In this case, the charge control section 11 reads out the priority degree "1" set for the AC adapter and the priority degree "3" set for the USB power of the USB 3.0 from the priority degree table T1 (refer to FIG. 3). Herein, the charge control section 11 selects the AC adapter of which the priority degree is set to be higher and sets the switch section 15c of the power source connection section 12c relating to the USB power to be switched off. Then, the charge control section 11 charges the rechargeable battery 14 through the charge circuit 13 with the use of the power supplied from the AC adapter (power source connection section 12a).

If detecting that the external power supplies are detached from all the power source connection sections 12, the charge control section 11 sets all the switch sections 15 to be switched on. Then, the charge control section 11 determines the number of the connected external power supplies described above to re-select an external power supply used for charging. The external power supply of the power source connection section 12 disabled due to the switching off of the switch section 15 may be excluded from the detached external power supplies.

Figure 4:
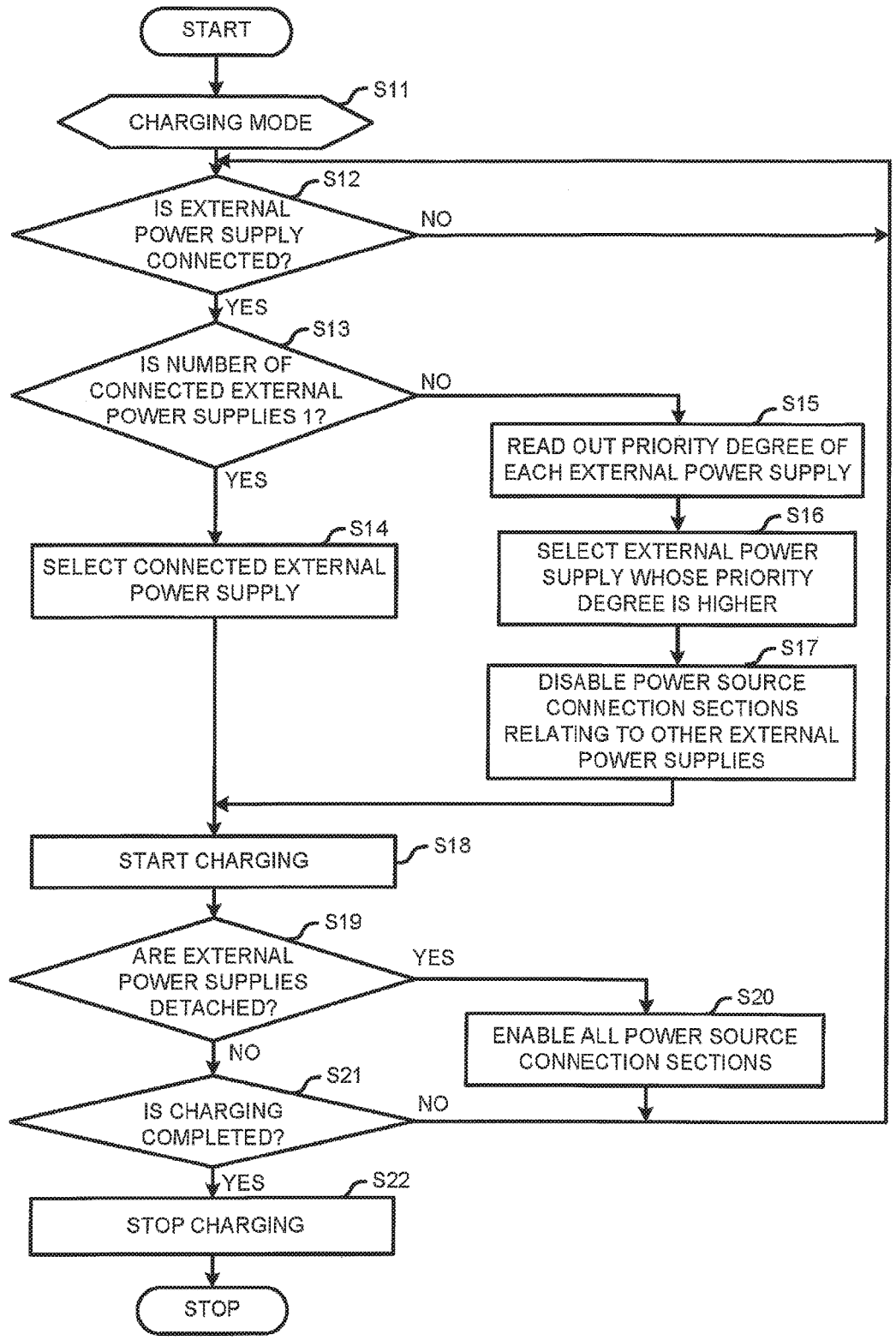
FIG. 4 is a flowchart exemplifying the procedures of a charge control processing carried out by the charge control system of the embodiment.

Hereinafter, a charge control processing carried out by the charge control system is described. FIG. 4 is a flowchart exemplifying the procedures of the charge control processing carried out by the charge control system.

First, if a charging mode in which the rechargeable battery 14 is charged is set in the portable printer 1 (Act S11), the charge control section 11 starts the charge control processing. Herein, the setting method and the setting timing of the charging mode are assumed to be optional. For example, on the condition that any one of the power source connection sections 12 is in a power receiving state, the charging mode may be set. In addition, on the condition that remaining battery level of the rechargeable battery 14 is below a specific threshold value, the charging mode may be set.

The charge control section 11 determines whether or not an external power supply is connected with a power source connection section 12 (Act S12). In a case in which the external power supply is not connected with any power source connection section 12, the charge control section 11 waits for until the external power supply is connected with any one of the power source connection sections 12 (Act S12: No).

In a case in which the external power supply is connected with the power source connection section 12 (Act S12: Yes), the charge control section 11 determines whether the number of the connected external power supplies is more than or equal to "1" (Act S13). In a case in which it is determined that one external power supply is connected (Act S13: Yes), the charge control section 11 selects this external power supply (Act S14). Next, the charge control section 11 charges the rechargeable battery 14 through the charge circuit 13 with the use of the power supplied from the selected external power supply (Act S18).

On the other hand, in a case in which it is determined that a plurality of external power supplies is connected (Act S13: No), the charge control section 11 reads out priority degrees set according to power supply types of these external power supplies from the priority degree table T1 (Act S15). Next, the charge control section 11 compares the read priority degrees to select an external power supply whose priority degree is higher than that of the rest (Act S16).

Then, the charge control section 11 sets the switch sections 15 of the power source connection sections 12 relating to other external power supplies except the selected external power supply among these connected external power supplies to be switched off, thereby disabling the power receiving functions of other power source connection sections 12 (Act S17). Then, the charge control section 11 charges the rechargeable battery 14 through the charge circuit 13 with the use of the power supplied from the selected external power supply (Act S18).

Subsequently, the charge control section 11 determines whether or not that the external power supplies are detached from the power source connection sections 12 is detected (Act S19). In a case in which the detachment is detected (Act S19: Yes), the charge control section 11 sets all the switch sections 15 to be switched on to enable the power source connection sections 12 (Act S20), and then returns to Act S12.

Further, in a case in which the detachment is not detected (Act S19: No), the charge control section 11 determines whether or not the charging for the rechargeable battery 14 is completed (Act S21). Herein, it is assumed that the method of determining the completion of the charging is optional. For example, the charge control section 11 cooperates with the charge circuit 13 to monitor charge capacity of the rechargeable battery 14 and may determine the completion of the charging on the condition that the charge capacity reaches a specific threshold value. Otherwise, on the condition that a determined time elapses after the charging is started, the charge control section 11 may determine the completion of the charging.

In a case in which it is determined that the charging in Act S21 is not completed (Act S21: No), the charge control section 11 returns to the processing in Act S12. Further, in a case in which it is determined that the charging is completed (Act S21: Yes), the charge control section 11 stops the charging of the rechargeable battery 14 (Act S22) and terminates the present processing.

As stated above, according to the charge control system, if a plurality of external power supplies is connected with the power source connection sections 12, the rechargeable battery 14 is charged with the external power supply of which the supply capacity is higher among these external power supplies. In this case, in the portable printer 1, the rechargeable battery 14 can be charged efficiently, and thus time needed to charge the rechargeable battery 14 can be reduced.

Figure 5:
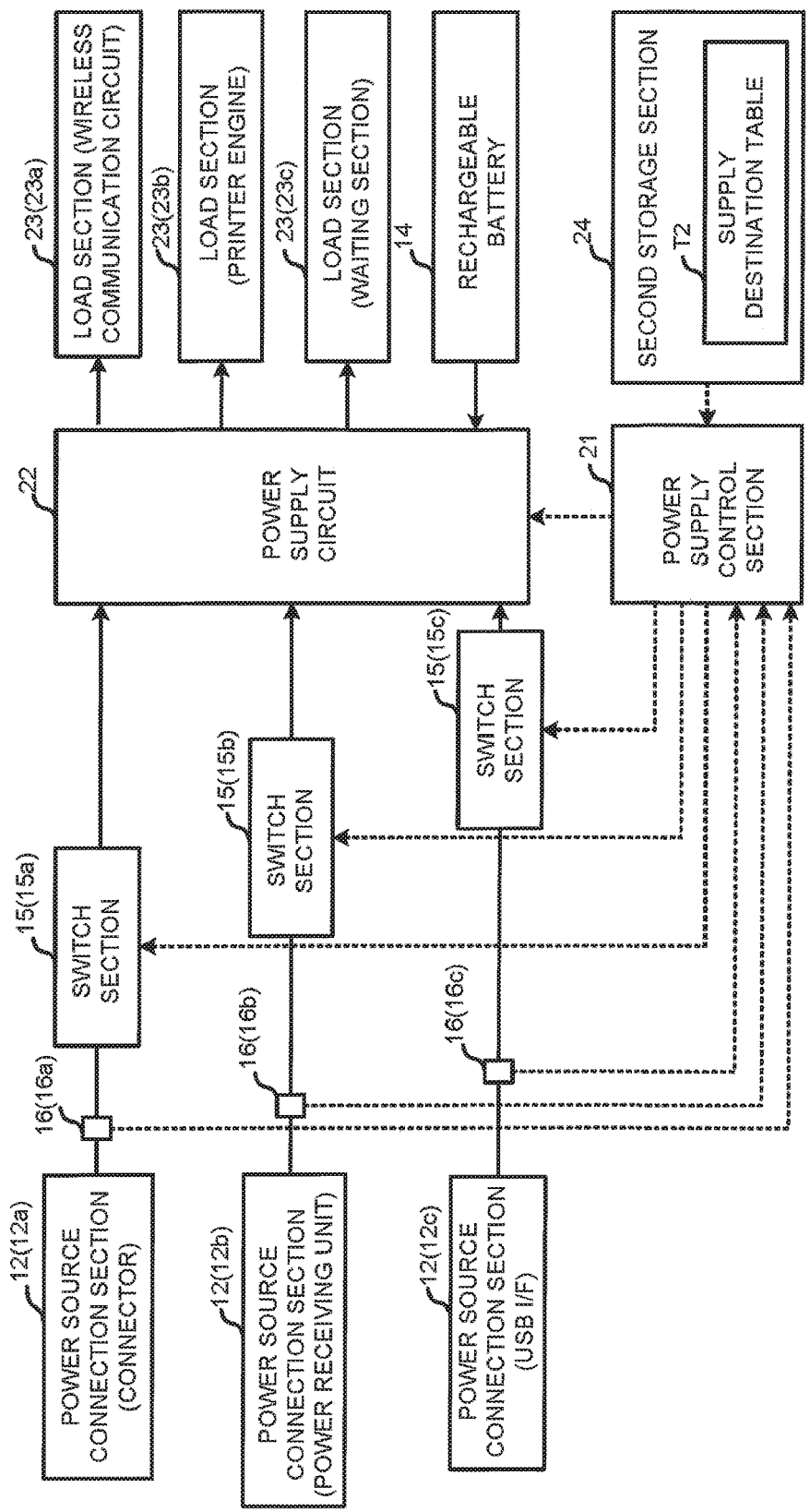
FIG. 5 is a block diagram exemplifying a power supply control system according to the embodiment.

Next, the power supply control system relating to a power supply control of the portable printer 1 is described. FIG. 5 is a block diagram exemplifying the power supply control system of the portable printer 1. The same components as the above are applied with the same reference numerals and are not described.

As shown in FIG. 5, the power supply control system of the portable printer 1 is provided with the power source connection section 12, the rechargeable battery 14, the switch sections 15, the detecting points 16, a power supply control section 21, a power supply circuit 22, load sections 23 and a second storage section 24. In FIG. 5, solid lines indicate power supply lines and dotted lines indicate controls lines.

The power supply control section 21 has the same structure as the charge control section 11. The power supply control section 21 functions as a detection section, a selection section and a power supply control section.

Part or all of the functions of the power supply control section 21 may be software structure realized through the cooperation of the processor and programs. Furthermore, part or all of the functions of the power supply control section 21 may be hardware structure realized by a dedicated processor.

The power supply circuit 22, under the control of the power supply control section 21, supplies the power supplied from the external power supply to each section such as the load section 23 of the portable printer 1. Besides, the power supply circuit 22, under the control of the power supply control section 21, supplies the power stored in the rechargeable battery 14 to each section such as the load section 23 of the portable printer 1. It is applicable that the power supply circuit 22 is used as a circuit identical to the charge circuit 13 (refer to FIG. 2).

The load section 23 is a power load section of the portable printer 1. For example, the load section 23 includes a wireless communication circuit 23*a* that realizes a wireless communication function such as WiFi, a printer engine 23*b* that realizes a print function and a waiting section 23*c* relating to the waiting of the printing (job). The waiting section 23*c* includes a memory relating to the waiting of the job and a control circuit that manages the memory. Hereinafter, if not specified, the wireless communication circuit 23*a*, the printer engine 23*b* and the waiting section 23*c* are uniformly depicted as the load section 23 simply.

The second storage section 24, which is a non-volatile storage medium identical to the first storage section 17, stores setting information relating to the power supply control. For example, the second storage section 24 stores a supply destination table T2 in which a load section 23 serving as a supply destination of power is determined by each power supply type of an external power supply. Further, the second storage section 24 may be the same storage medium as the first storage section 17.

FIG. 6 is a diagram exemplifying the data structure of the supply destination table T2. The supply destination table T2 contains data items "power supply type", "supply capacity" and "supply destination information".

In the supply destination table T2, the data item "power supply type" corresponds to the type of an external power supply capable of receiving power from a power source connection section 12. In FIG. 6, "AC adapter", "non-contact power supply" and "USB power" that respectively correspond to the power source connection sections 12*a*~12*c* are set as the power supply types. The supply capacities of the USB power differ from each other due to the difference in versions of USB standard, and thus the power supply type is set for each version.

The data item "supply capacity" indicates specification of power (ampere, volt) supplied from the external power supply of each power supply type.

In the data item "supply destination information", each function of the portable printer 1 and information for instructing whether or not a load section 23 relating to a function is set as a supply destination of power are set in an associated manner. In FIG. 6, it is exemplified that functions (communication, printing and waiting) realized by the load sections 23 (the wireless communication circuit 23*a*, the printer engine 23*b*, and the waiting section 23*c*) are set as function types. A supply destination of power is indicated by "◯" mark and a non-supply destination is indicated by "x" mark. The power is supplied from the rechargeable battery 14 to a load section 23 relating to a function set as a non-supply destination as described below.

It is preferred that a supply destination of an external power supply is set according to the supply capacity of the external power supply. Further, a load section 23 with such a function (e.g. communication function) that is often used is set as the supply destination of the external power supply. The supply destination may be set manually by the user or automatically by the portable printer 1 (power supply control section 21).

For example, in a case in which the power supplied from the AC adapter is greater than the total power consumption of the load sections 23, the power supply control section 21 sets all the functions (load sections 23) as the supply destinations of the AC adapter. Furthermore, in the power supplied by the non-contact power supply and the USB 3.0, there is a case where it is difficult to realize part of functions (e.g. printing function) of which power consumption is large from the point of stable operation. In this case, the power supply control section 21 sets part of the functions (printer engine 23*b*) of which power consumption is large as the non-supply destination.

Through the setting in this case, the power of the external power supply is used fully and efficiently, and the functions unrealized by the power of the external power supply can be realized with the power of the rechargeable battery 14.

Further, it is assumed that functions or other load sections that are not set in the supply destination table T2 are supplied with the power of the external power supply or the rechargeable battery 14. For example, the charge circuit 13 (refer to FIG. 2) is pre-set to supply the power of the external power supply.

With the foregoing structure, the power supply control section 21 enables the load section 23 to operate to execute the power supply control shown hereinafter.

First, the power supply control section 21 detects attachment/detachment of the external power supply to/from the power source connection section 12 and the power supply types of and the number of the connected external power supplies via the detecting points 16 similarly to the charge control section 11. In a case in which a plurality of external power supplies is connected with the power source connection sections 12, the power supply control section 21 selects one external power supply from a plurality of external power supplies connected with the power source connection sections 12 similarly to the charge control section 11.

For example, the power supply control section 21 refers to the supply destination table T2 to select the external power supply corresponding to the power supply type of which the supply capacity is higher from the external power supplies connected with power source connection sections 12. Further, similar to the priority degree table T1, a priority degree may be set for each power supply type contained in the supply destination table T2. In this case, the power supply control section 21 selects the external power supply corresponding to the power supply type of which the priority degree is higher from the external power supplies connected with power source connection sections 12.

Sequentially, the power supply control section 21 reads out supply destination information set according to the power supply type of one external power supply connected with power source connection section 12 or one selected external power supply from the supply destination table T2. Then, the power supply control section 21 enables the power to be supplied to the power supply circuit 22 based on the read supply destination information.

Specifically, the power supply control section 21 enables the power supplied from the external power supply to be supplied to the load section 23 relating to the function set as the power supply destination. Further, the power supply control section 21 enables the power of the rechargeable battery 14 to be supplied to the load section 23 relating to the function set as the non-power supply destination. In this way, the power supply control section 21, according to the power supply types of external power supplies connected with the power source connection sections 12, switches the load sections 23 serving as the supply destinations of power supplied from the external power supplies.

For example, it is assumed that the USB power of the USB 2.0 is connected with the power source connection section 12c. In this case, based on the supply destination information set as the power supply type "USB 2.0", the power supply control section 21 enables the power supplied from the power source connection section 12c to be supplied to the wireless communication circuit 23a. On the other hand, the power supply control section 21 enables the power of the rechargeable battery 14 to be supplied to the printer engine 23b and the waiting section 23c.

In a state in which no external power supply is connected with any power source connection section 12, the power supply control section 21 enables the power of the rechargeable battery 14 to be supplied to each section of the portable printer 1.

Figure 7:
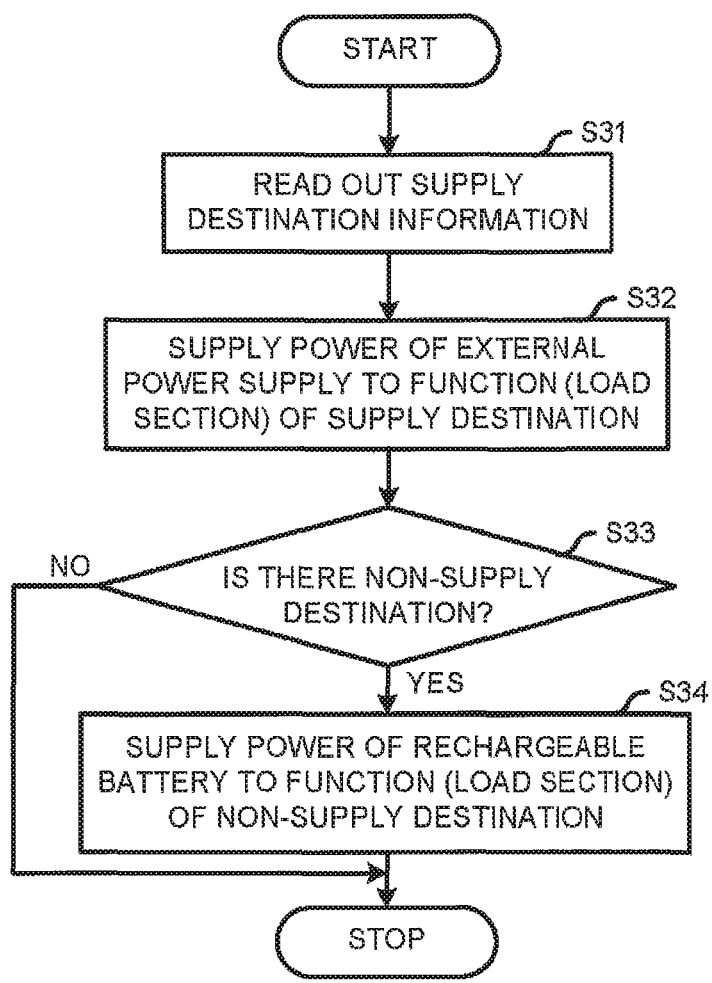
FIG. 7 is a flowchart exemplifying the procedures of a power supply control processing carried out by the power supply control system of the embodiment.

Hereinafter, a power supply control processing carried out by the power supply control system is described. FIG. 7 is a flowchart exemplifying the procedures of the power supply control processing carried out by the power supply control system. In the present processing, the premise is that one external power supply is connected with the power source connection section 12. In a case in which a plurality of external power supplies is connected with the power source connection sections 12, the power supply control section 21 carries out the same processing as Act S12~S17, S19 and S20 to select one external power supply that is used to supply power.

First, the power supply control section 21 reads out supply destination information associated with the power supply type of the external power supply connected with the power source connection section 12 from the supply destination table T2 (Act S31).

Then, the power supply control section 21 supplies the power of the external power supply to a load section 23 relating to a function set as a supply destination (Act S32). Next, the power supply control section 21 determines whether or not a function of a non-supply destination is set in the read supply destination information (Act S33).

In a case in which the function of the non-supply destination is not set (Act S33: No), the power supply control section 21 terminates the present processing. In a case in which the function of the non-supply destination is set (Act S33: Yes), the power supply control section 21 enables the power of the rechargeable battery 14 to be supplied to a load section 23 relating to the function of the non-supply destination (Act S34) and then terminates the present processing. Further, the power may be supplied to a load section 23 relating to the function of the non-supply destination at the timing when the function of the load section 23 is required.

As stated above, according to the power supply control system, in response to the power supply type (supply capacity) of an external power supply connected with a power source connection section 12, the power source connection section 12 selects a supply destination (load section 23) of power supplied from the external power supply power. Further, the power source connection section 12 enables the power of the rechargeable battery 14 to be supplied to a load section 23 serving as a non-supply destination of an external power supply. In this way, it is possible to combine the power of the external power supply with the power of the rechargeable battery 14 to enable the load sections 23 to operate. As amount of power supplied from the rechargeable battery 14 can be suppressed, the drive time of the rechargeable battery 14 can be delayed.

The structures of the charge control system (refer to FIG. 2) and the power supply control system (refer to FIG. 5) described above are examples, and various modifications thereof are applicable according to the installation conditions. For example, as shown in FIG. 8 and FIG. 9, it may be applicable that the functions of all the sections of the charge control system and the power supply control system are dispersed or merged.

Figure 8:
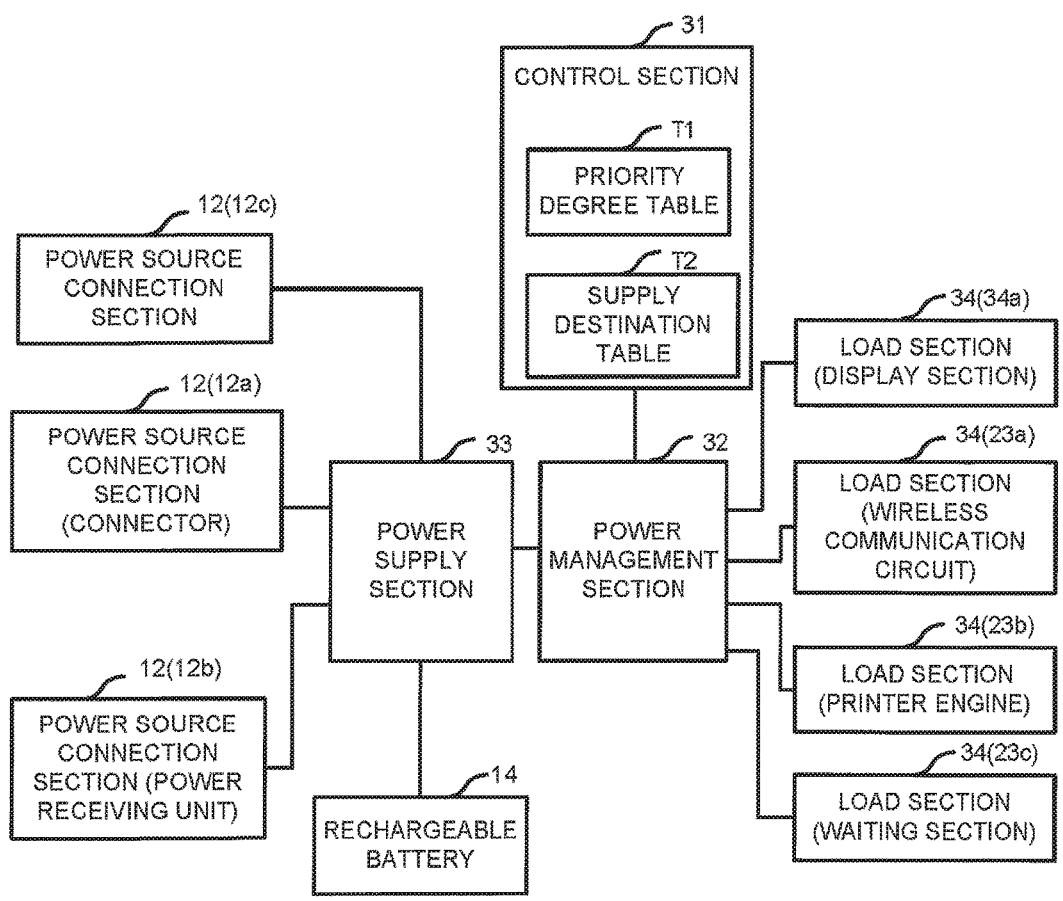
FIG. 8 is a block diagram exemplifying a control system according to the embodiment.
Figure 9:
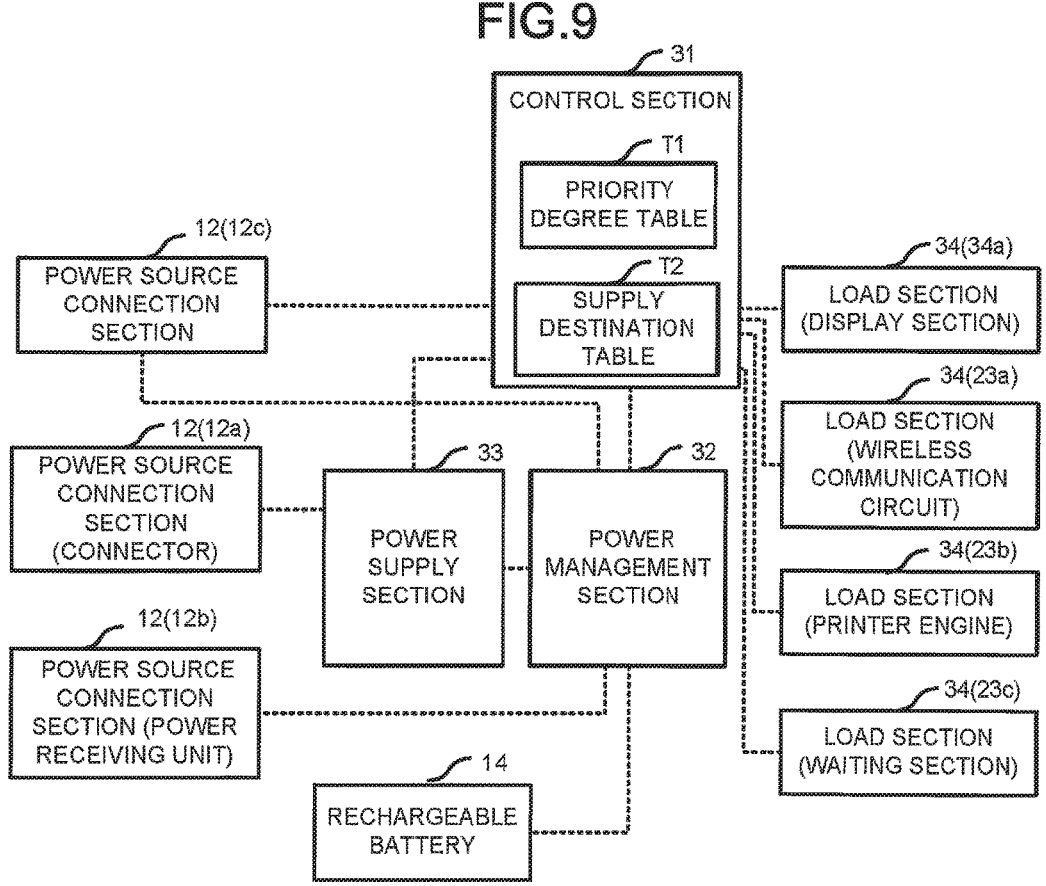
FIG. 9 is a block diagram exemplifying a control system according to the embodiment.

FIG. 8 and FIG. 9 are block diagrams exemplifying a control system containing the above-mentioned charge control system and the power supply control system. FIG. 8 shows a relationship of a power system, and FIG. 9 shows a relationship of a signal system. The same components as the above are applied with the same reference numerals.

As shown in FIG. 8 and FIG. 9, the control system is provided with a control section 31, a power management section 32, a power supply section 33, the power source connection section 12a, the power source connection section 12b, the power source connection section 12c, the rechargeable battery 14 and load sections 34.

The control section 31, which has the same computer structure as the charge control section 11, controls the operations of the portable printer 1 collectively. Specifically, the control section 31 controls operations of a display section 34a, the wireless communication circuit 23a and the printer engine 23b connected as the load sections 34.

The control section 31 realizes part of functions of the charge control section 11 and the power supply control section 21. The control section 31 includes a storage medium (not shown) that stores the priority degree table T1 and the supply destination table T2. The control section 31, based on signals input through the power management section 32 and the power supply section 33, detects attachment/detachment of external devices to/from the power source connection sections 12, the power supply type of and the number of the external devices. Further, the control section 31 detects the version of connection standard of USB power connected with the power source connection section 12c.

The power management section 32 together with the power supply section 33 functions as the power supply circuit 22 supplies power supplied from the power supply section 33 and power of the rechargeable battery 14 to each section of the portable printer 1. The power management section 32 detects attachment/detachment of external power to/from the power source connection sections 12b and 12c and power supply types of the external power. Further, the power management section 32 functions as the switch sections 15b and 15c to enable or disable the power source connection sections 12b and 12c under the control of the control section 31.

The power supply section 33 supplies the power received from the power source connection section 12 to each section of the portable printer 1 through the power management section 32. The power supply section 33 supplies the power supplied from the rechargeable battery 14 to each section of the portable printer 1 through the power management section 32. The power supply section 33 functions as the charge circuit 13 to charge rechargeable battery 14 with the power supplied from the external power supply under the control of the control section 31. The power management section 32 detects attachment/detachment of an external power supply to/from the power source connection section 12a and the power supply type of the external power supply. Further, the power management section 32 functions as the switch section 15a to enable or disable the power source connection section 12a under the control of the control section 31.

With the structure shown in FIG. 8 and FIG. 9, the control section 31 cooperates with the power management section 32 and the power supply section 33 to execute the same charge control as the above.

Specifically, the control section 31, based on detection results of the power management section 32 and the power supply section 33, determines power supply types of and the number of external power supplies connected with the power source connection section 12. In a case in which one external power supply is connected, the control section 31 selects the external power supply. Then, the control section 31 charges the rechargeable battery 14 with the power supplied from the external power supply.

On the other hand, in a case in which a plurality of external power supplies is connected, the control section 31 selects one external power supply from a plurality of connected external power supplies according to the priority degree table T1. Next, the control section 31 disables the power receiving (power supply) function of the power source connection sections 12 connected with the external power supplies other than the selected external power supply among the power source connection sections 12 connected with the external power supplies. Then, the control section 31 charges the rechargeable battery 14 with the power supplied from the selected external power supply.

Further, the control section 31 cooperates with the power management section 32 and the power supply section 33 to execute the same power supply control as the above.

Specifically, the control section 31 reads out supply destination information associated with the power supply type of one of the external power supplies connected with the power source connection sections 12 from the supply destination table T2. Next, the control section 31 enables the power of the external power supply to be supplied to a load section 34 relating to a function set as a supply destination. Further, the control section 31 enables the power of the rechargeable battery 14 to be supplied to a load section 34 relating to a function set as a non-supply destination.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the foregoing embodiments, one external power supply is selected according to the priority degree and the supply capacity of each power supply type set in the priority degree table T1 or the supply destination table T2; however, the present invention is not limited. As another example, it may be applicable that the charge control section 11 or the power supply control section 21 actually acquires (measures) the supply capacities of the external power supplies via the detecting points 16. In a case of adopting this structure, the charge control section 11 or the power supply control section 21 selects one external power supply from a plurality of external power supplies connected with the power source connection sections 12 according to the acquired supply capacities.

Further, the charge control section 11 and power supply control section 21 each may function as a notification section that notifies the power supply type of the selected external power supply used for charging or power supply. In a case of adopting this structure, for example, in the structure shown in FIG. 8 and FIG. 9, if one external power supply is selected, the control section 31 enables the power supply type of the selected external power supply to be displayed on the display section 34a. The method of notifying the power supply type is not limited to the display on the display section 34a. For example, if the portable printer 1 is provided with an indicator, the power supply type may be notified through the indicator.

What is claimed is:
1. An electric apparatus, comprising:
a plurality of connection devices configured to be connectable to a plurality of external power supplies;
a battery;
a charge circuit configured to charge the battery using electric power supplied from the external power supplies;
a plurality of switch sections each connected between the connection devices and the charge circuit; and
a controller configured to control power supplied from the external power supplies to the charge circuit, wherein the controller is configured to:

measure supply capacities of the external power supplies that are connected to the connection devices, and compare the supply capacities of the external power supplies and switch off the switch sections of the connection devices that are connected to the external power supplies except an external power supply having a highest supply capacity.

2. The electric apparatus according to claim 1, wherein a switch section is on in a state in which none of the external power supplies are connected to a corresponding connection device.

3. The electric apparatus according to claim 1, further comprising
a display section, wherein
the controller is configured to display, on the display section, a power supply type of an external power supply that is connected to a switch section that is on.

4. The electric apparatus according to claim 1, further comprising:
a plurality of power load sections;
a power supply circuit configured to supply power supplied from the external power supplies and the battery to the power load sections, the power supply circuit being connected to the switch sections and the battery; and
a power supply controller configured to:
select a supply destination from the plurality of power load sections based on a supply capacity of an external power supply that is connected to a switch section that is on, the supply destination being a power load section to which power of the external power supply is supplied through the power supply circuit, and
supply power from the battery through the power supply circuit to the power load sections except the supply destination.

5. The electric apparatus according to claim 4, wherein the power supply controller is configured to supply power from the battery to the plurality of power load sections in a state in which none of the external power supplies are connected to any of the connection devices.

* * * * *